US009621255B1

(12) United States Patent
Chu

(10) Patent No.: US 9,621,255 B1
(45) Date of Patent: Apr. 11, 2017

(54) CHANNELIZER SUPPLEMENTED SPACECRAFT TELEMETRY AND COMMAND FUNCTIONALITY

(71) Applicant: Space Systems/Loral, LLC, Palo Alto, CA (US)

(72) Inventor: Peter Y. Chu, Palo Alto, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 0 days.

(21) Appl. No.: 14/939,433

(22) Filed: Nov. 12, 2015

(51) Int. Cl.
*H04B 7/15* (2006.01)
*H04B 7/185* (2006.01)

(52) U.S. Cl.
CPC ................ *H04B 7/18506* (2013.01)

(58) Field of Classification Search
CPC .................. H04L 5/0044; H03H 17/0266
See application file for complete search history.

(56) References Cited

U.S. PATENT DOCUMENTS

| 3,604,945 | A | 9/1971 | Hoffman et al. | |
|---|---|---|---|---|
| 5,855,341 | A * | 1/1999 | Aoki ................... | B64G 1/1085 244/158.8 |
| 6,735,501 | B1 | 5/2004 | Rulison et al. | |
| 7,675,985 | B1 * | 3/2010 | Watson ................ | H04L 5/0044 370/464 |
| 8,064,920 | B2 | 11/2011 | Bell et al. | |
| 8,483,888 | B2 * | 7/2013 | Boileau .............. | H04B 7/18519 701/3 |
| 2003/0113121 | A1 | 6/2003 | Gayrard et al. | |
| 2009/0057492 | A1 | 3/2009 | Harris | |
| 2010/0269143 | A1 | 10/2010 | Rabowsky | |
| 2012/0008664 | A1 * | 1/2012 | Nasta ................... | H03J 1/0008 375/214 |
| 2013/0299642 | A1 | 11/2013 | Eickhoff | |
| 2014/0281802 | A1 * | 9/2014 | Coe ........................ | G06F 11/10 714/763 |
| 2015/0162955 | A1 | 6/2015 | Burch | |

FOREIGN PATENT DOCUMENTS

| EP | 0520203 B1 | 8/1998 |
|---|---|---|
| JP | 2002205697 A | 7/2002 |
| JP | 2010165148 A | 7/2010 |
| KR | 1020040026736 A | 1/2004 |

\* cited by examiner

*Primary Examiner* — Mohammed Rachedine
(74) *Attorney, Agent, or Firm* — Weaver Austin Villeneuve & Sampson LLP

(57) ABSTRACT

A spacecraft includes a payload subsystem including a digital channelizer. The digital channelizer provides at least a portion of spacecraft command or telemetry functionality. The spacecraft may optionally also include a telemetry and command (T&C) subsystem, the T&C subsystem including one or more of a command receiver, a command decoder, a telemetry encoder and a telemetry transmitter. The digital channelizer may be communicatively coupled with at least one of the command receiver, the command decoder, the telemetry transmitter and the telemetry encoder.

20 Claims, 12 Drawing Sheets

CHANNELIZER SUPPLEMENTED SPACECRAFT TELEMETRY AND COMMAND FUNCTIONALITY

TECHNICAL FIELD

This invention relates generally to spacecraft and, in particular, to techniques for supplementing and/or replacing functions of a spacecraft telemetry and command subsystem.

BACKGROUND

The assignee of the present invention manufactures and deploys spacecraft for, inter alia, communications and broadcast services.

Such a spacecraft includes a telemetry and command (T&C) subsystem that enables a ground station to command the spacecraft, monitor performance and health of the spacecraft ("T&C functionality"). The T&C subsystem may also provide a ranging capability, by which the spacecraft's distance (range) with respect to a ground station may be determined, and may also be referred to as a telemetry command and ranging (TC&R) subsystem.

The T&C subsystem equipment will normally be provided with at least 2:1 redundancy and the spacecraft can therefore tolerate, with no degradation in performance, a failure of at least a single component within the T&C subsystem. Nevertheless, because a second failure in the T&C subsystem may result in complete loss of the entire spacecraft, techniques for mitigating impacts of component failures are desirable. For example, U.S. Pat. No. 6,735,501, assigned to the assignee of the present disclosure, and hereby incorporated into the present disclosure in its entirety for all purposes, describes techniques for mitigating impacts of failures within a T&C subsystem. In addition, issues in the T&C subsystem such as design or implementation issues, requirement changes, mission evolution, frequency allocation changes, etc, and new techniques may make it desirable to decommission one or more of the T&C subsystem components or to enhance certain features of T&C subsystem components.

SUMMARY

The presently disclosed techniques permit a spacecraft to maintain a substantial amount, or even the entirety, of T&C functionality, notwithstanding the loss of both a primary and a redundant T&C component such as a command receiver, a command decoder, a telemetry transmitter and a telemetry encoder. The presently disclosed techniques further provide an opportunity to change or enhance the functions of the T&C subsystem after launch in a unit-by-unit incremental manner in response to new techniques or new requirements.

According to some implementations, a spacecraft includes a payload subsystem including a digital channelizer. The digital channelizer provides at least a portion of spacecraft command functionality or spacecraft telemetry functionality.

In some examples, the payload subsystem may provide all of the spacecraft command functionality or the spacecraft telemetry functionality. In some examples, the spacecraft excludes a dedicated telemetry and command subsystem.

In some examples, the spacecraft may further include a telemetry and command (T&C) subsystem, the T&C subsystem including one or more of a command (CMD) receiver, a CMD decoder, a telemetry (TLM) encoder and a TLM transmitter. The digital channelizer may be communicatively coupled with at least one of the CMD receiver, the CMD decoder, the TLM transmitter and the TLM encoder. In some examples, the digital channelizer may be communicatively coupled with two or more of the CMD receiver, the CMD decoder, the TLM transmitter and the TLM encoder by a respective signal path. In some examples, at least one of the respective signal paths may be actuated on or off. In some examples, the digital channelizer may be communicatively coupled with the computer and one or both of the digital channelizer and the computer may be configured to select one or more of the respective signal paths. In some examples, one or both of the digital channelizer and the computer may be configured to actuate the respective signal paths on or off. In some examples, the T&C subsystem may include a ranging capability.

In some examples, the payload subsystem may be configured to provide one or more of a CMD receiver functionality, a CMD decoder functionality, a CMD functionality, a TLM transmitter functionality, a TLM encoder functionality and a TLM functionality. In some examples, the payload subsystem may be configured to mitigate a deficiency in one or more of the CMD receiver, the CMD decoder, the TLM transmitter, and the TLM encoder. In some examples, the deficiency may result from a component failure or other reason. In some examples, the payload subsystem may be configured to mitigate one or more deficiencies in two or more of the CMD receiver, the CMD decoder, the TLM transmitter, and the TLM encoder. In some examples, the payload subsystem may be configured to mitigate one or more deficiencies of three or more of the CMD receiver, the CMD decoder, the TLM transmitter, and the TLM encoder.

According to some implementations, a method includes operating a spacecraft in a contingency mode, the spacecraft including a telemetry command (T&C) subsystem and a payload subsystem, the T&C subsystem including one or more of a command receiver, a command decoder, a telemetry encoder and a telemetry transmitter, the payload subsystem including a digital channelizer. The contingency mode includes a deficiency of at least one of the command receiver, the command decoder, the telemetry transmitter and the telemetry encoder, the deficiency resulting from a component failure or other reason. Operating the spacecraft in the contingency mode includes mitigating the deficiency by providing, with the digital channelizer, a functionality normally performed by the at least one of the command receiver, the command decoder, the telemetry transmitter and the telemetry encoder.

In some examples, the digital channelizer may be communicatively coupled with at least one of the command receiver, the command decoder, the telemetry transmitter and the telemetry encoder.

In some examples, the payload subsystem may be configured to provide one or more of a CMD receiver functionality, a CMD decoder functionality, a CMD functionality, a TLM transmitter functionality, a TLM encoder functionality and a TLM functionality.

According to some implementations, a non-transitory computer readable medium has software stored thereon, the software including instructions for causing a processor to: operate a spacecraft in a contingency mode, the spacecraft including a telemetry command (T&C) subsystem and a payload subsystem, the T&C subsystem including one or more of a command receiver, a command decoder, a telemetry encoder and a telemetry transmitter, the payload subsystem including a digital channelizer. The contingency mode includes a deficiency of at least one of the command receiver, the command decoder, the telemetry transmitter and the telemetry encoder, the deficiency resulting from a component failure or other reason. Operating the spacecraft in the contingency mode includes mitigating the deficiency by providing, with the digital channelizer, a first functionality normally performed by the at least one of the command receiver, the command decoder, the telemetry transmitter and the telemetry encoder.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Figure 1:
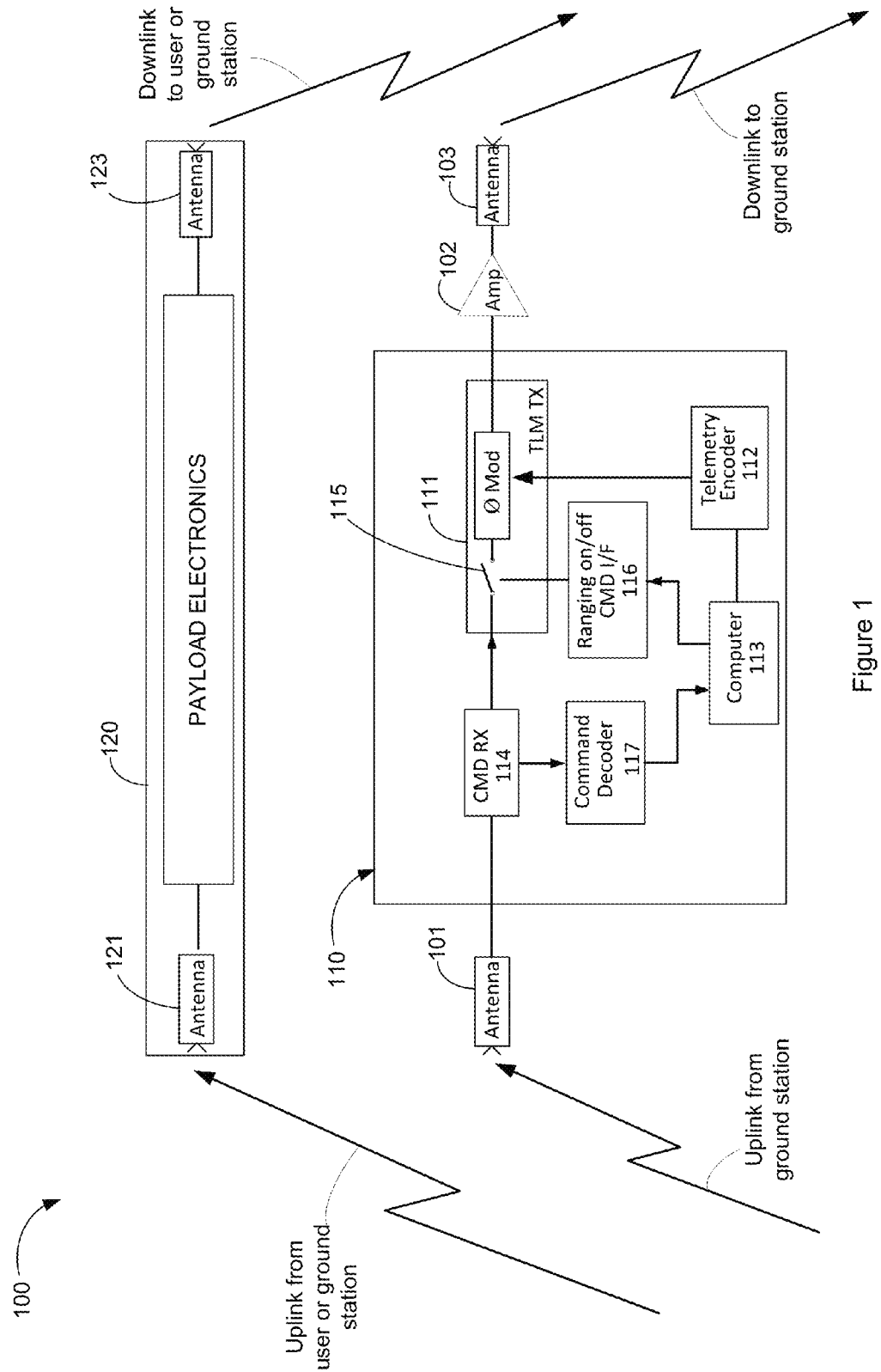
FIG. 1 illustrates a simplified block diagram of a spacecraft including a payload subsystem and a T&C subsystem.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The presently disclosed techniques permit a spacecraft to maintain a substantial amount or even all of T&C functionality, notwithstanding the loss of both a primary and a redundant T&C component such as a command receiver, a command decoder a telemetry transmitter and a telemetry encoder without adding additional hardware to the T&C subsystem.

FIG. 1 illustrates a simplified block diagram of a spacecraft 100 that includes a conventional TC&R subsystem 110 and a payload subsystem 120. The TC&R subsystem 110 includes a telemetry (TLM) transmitter (Tx) 111 and a TLM encoder 112. The TLM encoder 112 is communicatively coupled with the TLM transmitter 111 and with an on board computer 113. In some implementations, the TLM encoder 112 may be a module (tray or "slice") of the on board computer 113 or TLM transmitter 111. Whether or not this is so, the TLM encoder 112 receives spacecraft telemetry data from the spacecraft on-board computer 113. The spacecraft telemetry data may include operational and environmental data regarding the performance, status and "health" of any number of spacecraft payload and bus subsystems. A function of the TLM encoder 112 (the "TLM encoder functionality") is to process (or encode) the spacecraft telemetry data received from the on board computer 113 into a baseband signal and forwarded it to the TLM transmitter 111 for transmission over a downlink to a ground station. More particularly, a function of the TLM transmitter 111 (the "TLM transmitter functionality") is to modulate the baseband signal onto an intermediate frequency (IF) signal and upconvert modulated baseband signal to an RF carrier signal. For example the TLM transmitter functionality may include use of Quadrature Phase Shift Keying (QPSK) to modulate the baseband signal. The RF carrier signal may be forwarded, after amplification at amplifier 102 to antenna 103 and downlinked to the ground station. The TLM encoder functionality and the TLM transmitter functionality, in combination may be referred to herein and in the claims as the "TLM functionality".

The TC&R subsystem 110 also includes provisions for command reception and processing. In the illustrated example, commands may be uplinked via a command carrier signal from a ground station, received by antenna 101 and forwarded to a command ("CMD") receiver 114. A function of the CMD receiver (the "CMD receiver functionality") is to down convert and demodulate the command carrier signal to an IF baseband signal. Outputs from the CMD receiver 114 may be forwarded to CMD decoder 117. A function of the CMD decoder 117 (the "CMD decoder functionality") is to bit-detect the IF baseband signal and format a resulting bit stream into digital command data. In some implementations, the CMD decoder 117 may be a module of the on board computer 113 or CMD receiver 114. Whether or not this is so, the CMD decoder 117 forwards command data to the on board computer 113. The CMD receiver functionality and the CMD decoder functionality, in combination may be referred to herein and in the claims as the "CMD functionality".

Some implementations of a T&C subsystem may configure functionalities into different combination of hardware units, but remain within the scope of the definitions here. Some implementations may use features such as cross strap, encryption/decryption, error coding/decoding, spread spectrum, commandable or variable frequencies, but still have functionalities defined here.

The TC&R subsystem 110 also includes provisions for supporting ranging operations. During a ranging operation, the on board computer 113 may cause a ranging on/off CMD interface 116 to close (or enable) switch 115. In some implementations, the ranging on/off CMD interface 116 may be a module of the on board computer 113, the CMD decoder 117 and/or the TLM encoder 112. In some implementations, switch 115 may be a hardware component or a software/firmware feature of the CMD decoder 117 or the TLM encoder 112. When switch 115 is in a closed (enabled) position, one or more ranging tones uplinked from the ground station (often as part of the command uplink) may be received and demodulated by CMD receiver 114 and forwarded to TLM transmitter 111 for modulation and transmission over the downlink to the ground station. A difference in phase between the uplinked ranging tone(s) and the downlinked ranging tone(s) may be measured and used to calculate the distance of the spacecraft from the ground station. An alternative is to include pulse patterns in the ranging signal and measure the time delay.

Although, for clarity of illustration, antenna 101, amplifier 102 and antenna 103 are shown outside of the payload subsystem 120 in some implementations these components may be shared between the payload subsystem 120 and the TC & R subsystem 110. Moreover it will be appreciated that some or all of antennas 101, 121, 103, and 123 may include a reflector or sub-reflector (not illustrated) rather than directly radiating to ground. Finally, the customary dual, triple or quad redundancy of units 101, 102, 103, 111, 112, 114, 115, 117 is, for clarity of illustration, not shown).

Figure 2:
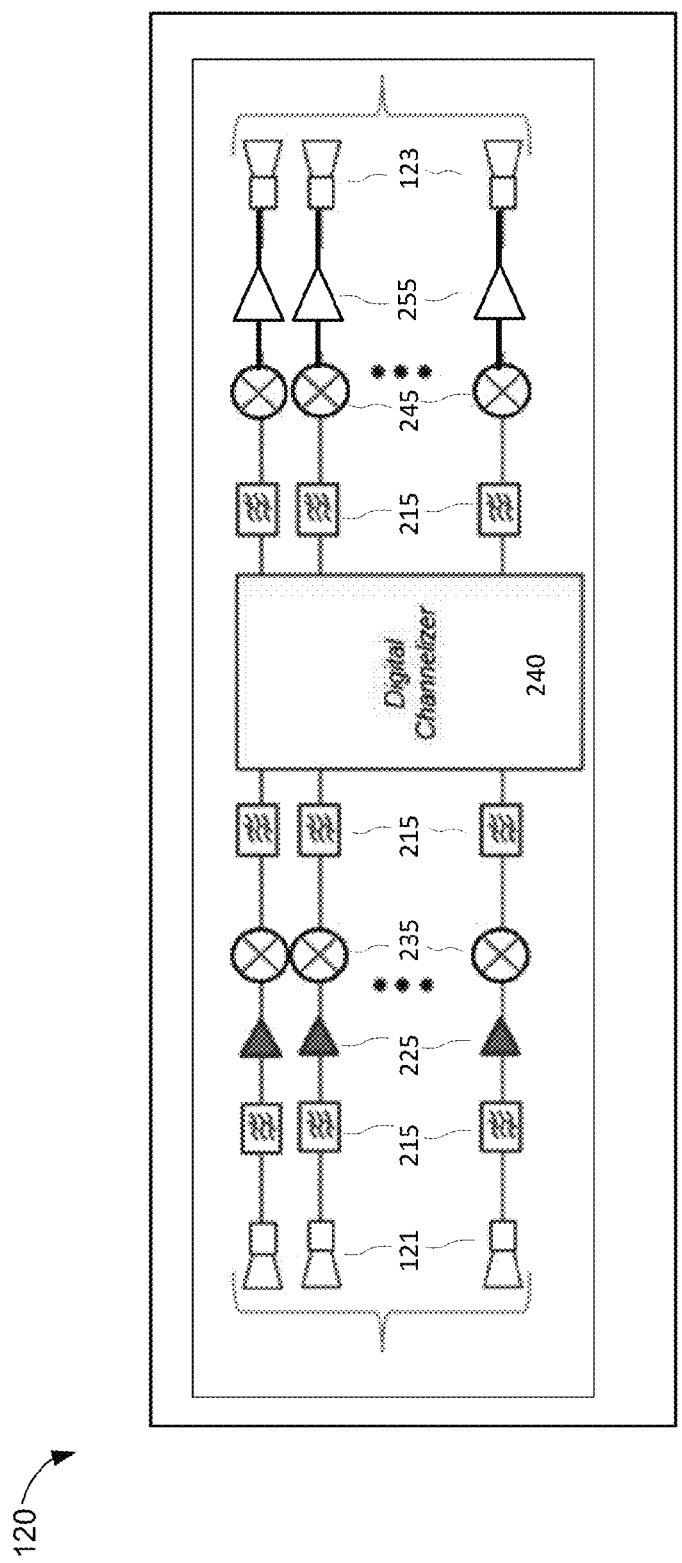
FIG. 2 illustrates a simplified block diagram of a spacecraft payload subsystem including a digital channelizer.

Referring now to FIG. 2, a simplified block diagram of the satellite payload subsystem 120 is illustrated. The payload subsystem 120 may include antenna antennas 121, filters 215, low-noise amplifiers (LNAs) 225, frequency converters including input frequency converters 235, at least one digital channelizer 240, frequency converters including output frequency converters 245, power amplifiers (PAs) 255, which may or may not include linearization, and antennas 123.

The digital channelizer 240 may receive analog RF input signals by way of a quantity 'N' of receive ports, where 'N' is greater than or equal to 1. The digital channelizer 240 may enable the payload subsystem 200 to process multiple input signals and to reconfigurably distribute portions of those input signals into multiple output signals and to create reconfigurable channels to route the multiple input signals to multiple output ports. The digital channelizer 240 may include analog-to-digital converters, digital-to-analog converters, control computer(s) with software or firmware, and signal processing electronics (not illustrated). The digital channelizer 240 may forward analog RF output signals by way of a quantity 'M' of transmit ports, where 'M' is greater than or equal to 1. It will be appreciated that quantity 'M' is not necessarily equal to quantity 'N'. The multiple inputs and outputs provide redundancy for the payload 120, in addition to redundancy within the channelizer.

The digital channelizer 240 may be capable of operating over all or a substantial part of the frequency ranges that are allocated to the payload subsystem 200 which often encompass the T&C frequencies. The digital channelizer 240 may sub-divide the uplink frequency spectrum into smaller segments and permit fine bandwidth adjustability in the smaller segments. The digital channelizer 240 may also tune, in fine or course increments, responsive to ground or onboard commands, the center frequency and bandwidth allocated to a particular uplink beam on a communications satellite, in addition to adjusting the frequency response curve and other characteristics of each channel. The digital channelizer 240 may directly handle uplink frequencies and/or downlink frequencies, thus, in some implementations, replacing some or all of the filters 215, the input frequency converters 235 and output frequency converters 245. Other functions of a digital channelizer may include frequency conversion, demodulation, bit detection, and modulation, among others. Those functions allow, by pre-planning in design or reprogramming after launch, a portion of a digital channelizer to be configured to replace or supplement a dedicated T&C unit.

Figure 3:
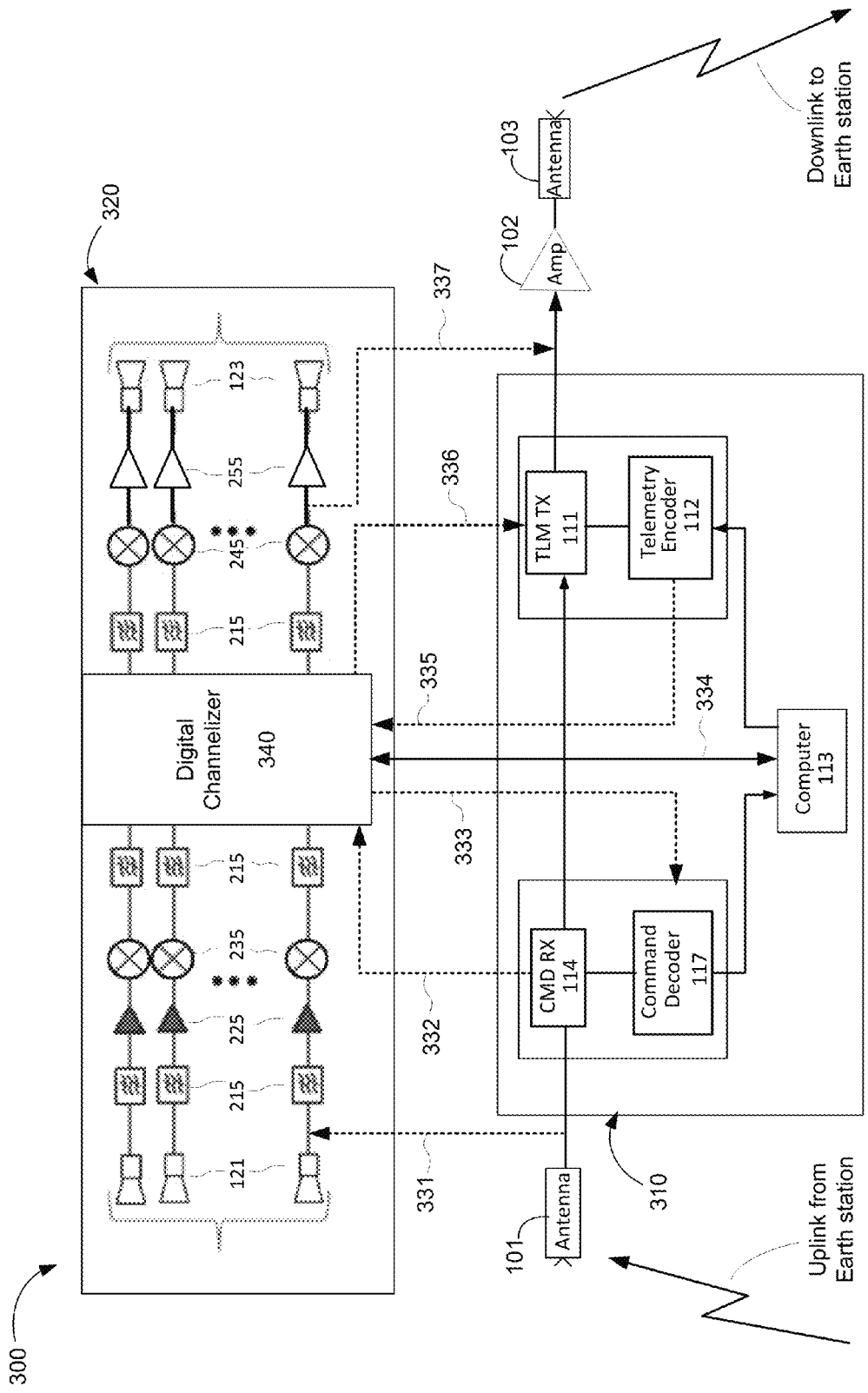
FIG. 3 illustrates features of a spacecraft including a payload subsystem and a T&C subsystem according to an implementation.

FIG. 3 illustrates a simplified block diagram of a spacecraft in accordance with an implementation. Spacecraft 300 includes a payload subsystem 320 that incorporates a digital channelizer 340. The digital channelizer 340, alone or in cooperation with other elements of the payload subsystem 320, may provide at least a portion of spacecraft T&C functionality. In some implementations, the T&C functionality may be provided using different bandwidth, carrier frequency, modulation, data rate, data content, etc than those in the T&C subsystem 310. In some implementations the digital channelizer 340 may be communicatively coupled with a TC&R subsystem 310. In the illustrated implementation, one or more of signal paths 331, 332, 333, 334, 335, 336, and 337 may be selected by the one or both of the digital channelizer 340 and the computer 113 such that at least partial functionality of one or more components within the TC&R subsystem 310 may be effectively replaced by functionality within the digital channelizer 340, with possibly different bandwidth, carrier frequency, modulation, data rate, data content, etc. It will be appreciated that any or all of signal paths 331, 332, 333, 334, 335, 336, and 337 may be configured with 2:1 or higher redundancy, and some of the signal paths 331-337 may be omitted in a particular implementation. If the command frequencies are not in the payload frequency range, the signal path 331 may include filters and frequency converter, or the channelizer can handle command uplink frequencies directly without additional filters and converters in path 331, and therefore bypass some filters 215, LNAs 225, and downconverters 235. Likewise, the signal path 337 may have similar arrangements to handle the telemetry frequencies if not in the payload frequency range.

In the illustrated implementation, there is a two-way data link 334 between the digital channelizer 340 and the computer 113. In some implementations, the computer 113 may be regarded as being part of the TC&R subsystem 310 (as illustrated). More commonly, however, the computer 113 may be a general purpose processor that performs other functions on board the spacecraft including for example attitude determination and control functions and general spacecraft control, and may be regarded as part of the satellite control subsystem.

FIGS. 4A through 4H illustrate techniques for replacing or supplementing the functionality of one or more components of TC&R subsystem 310 under various scenarios. In each of FIGS. 4A through 4H, elements (boxes and signal paths) depicted with dashed lines relate to elements that are regarded to have an impaired or deemed to be deficient functionality as a result of having failed, or for any other reason. For example, use of an element may become undesirable or less than optimal as a result of design or implementation problems, or a change in requirements or frequency allocation. Such an element may be referred to herein and in the claims as a "deficient" element or as an element having a "deficiency". It should be noted, however, that the illustrated techniques replacing or supplementing the functionality of one or more components of TC&R subsystem 310 may be implemented whether or not any specific deficiency in the T&C subsystem exists or is noticed. The scenarios illustrated in FIGS. 4A-4H may provide fail-over, redundant, standby, parallel, improved, and/or supplemental capability for performance of the deemed to be deficient hardware or functionality.

In FIGS. 4A through 4H, signal paths depicted with dotted lines relate to signal paths that are not necessarily present or in use. Such signal paths may be in a standby condition and/or may not be required to be operated during the depicted scenario. Signal paths depicted with heavy solid lines relate to alternative signal paths which, in the depicted scenarios, are in use so as to, for example, mitigate for and/or bypass a T&C subsystem element, or to allow parallel signal flows so as to, for example, increase functional redundancy without adding hardware units in the T&C subsystem. Heavy dash lines depict a possible alternative path for an optional ranging capability.

Figure 4A:
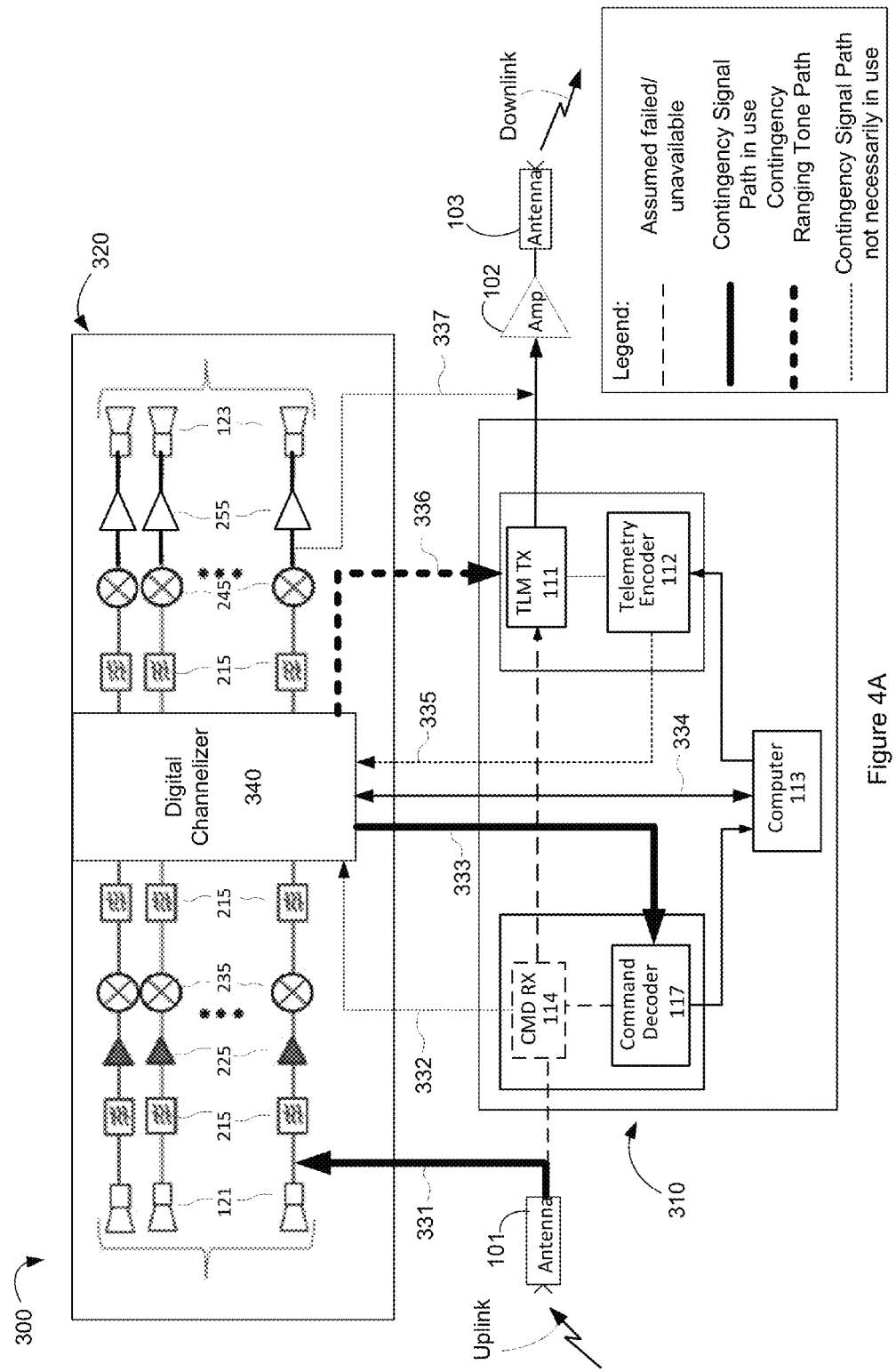
FIGS. 4A through 4H illustrate examples of techniques for replacing or supplementing the functionality of one or more components of a T&C subsystem under various scenarios.

Referring first to FIG. 4A, in the event of, for example, a deficient command receiver 114, command RF signals received by antenna 101 may be routed by way of the signal path 331 to the payload subsystem 320. The digital channelizer 340 may be configured to provide the CMD receiver functionality normally provided by the CMD receiver 114 and provide outputs by way of the signal path 333 to the command decoder 117, and optionally the ranging signal through path 336 to the telemetry transmitter 111. As a result, a deficiency of the CMD receiver 114 may be mitigated by the digital channelizer 340. The CMD functionality in the channelizer 340 may be implemented ahead of time, or uploaded into the channelizer after a deficiency is noted. Even if no deficiency is noted, the CMD receiver functionality provided by the channelizer 340 may be operated as a hot standby, or as a cold standby, or always hot (enabled and signal flowing in parallel) for improved data integrity through, for example, a voting mechanism in the CMD decoder 117 and/or Computer 113, or to simplify or speed up failure recovery. Further, the channelizer 340 may allow improved or supplemental performance such as lower or higher data rate. In such scenarios, the CMD receiver may be regarded as the baseline capability with proven heritage or simple operation, while the channelizer provides additional spacecraft command capability and/or flexibility.

Figure 4B:
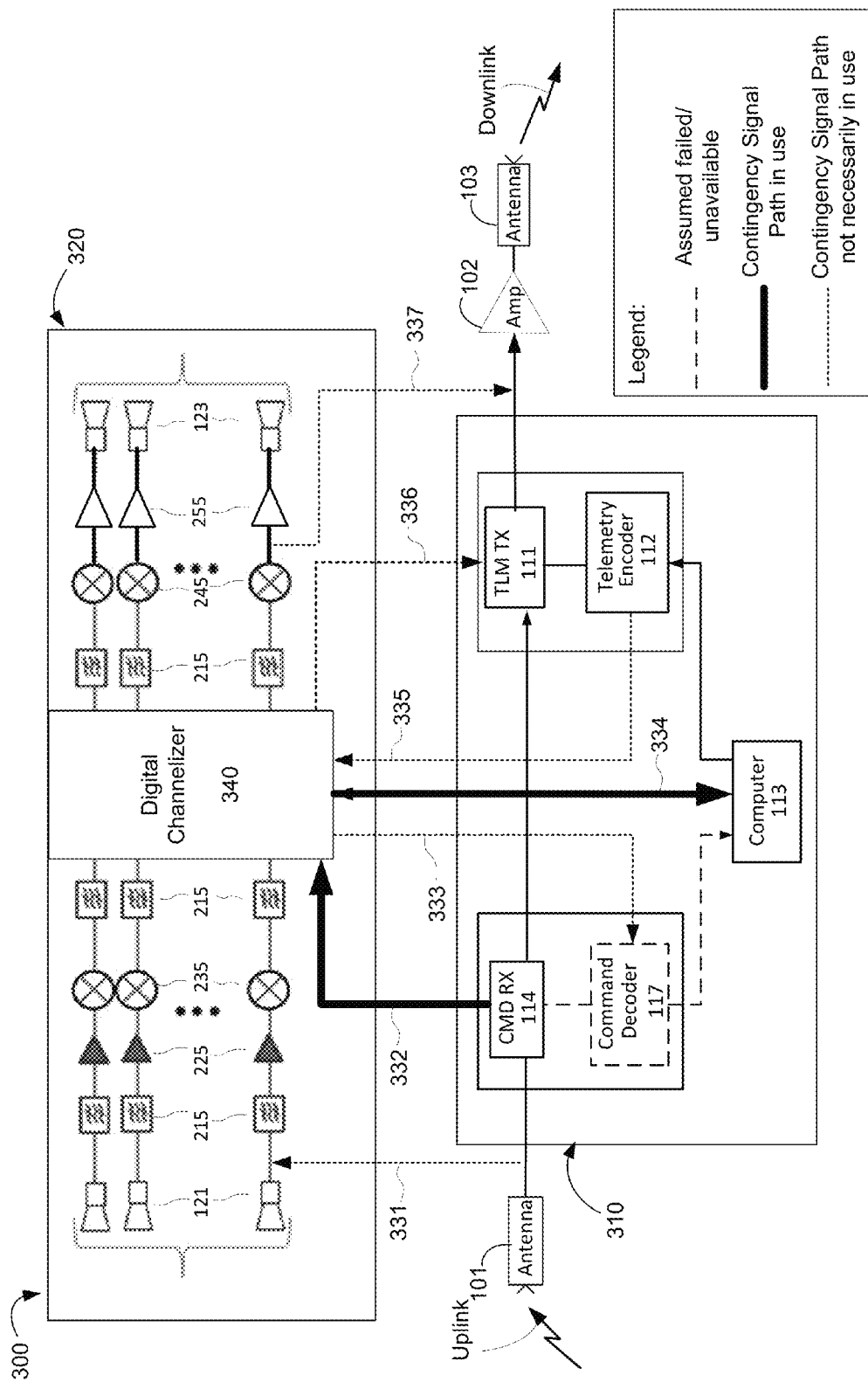

Referring next to FIG. 4B, in the event of a deficient command decoder 117, outputs of command receiver 114 may be forwarded by way of the signal path 332 to the digital channelizer 340. The digital channelizer 340 may be configured to provide the CMD decoder functionality normally provided by the CMD decoder 117 and to provide outputs by way of the signal path 334 to the computer 113. As a result, a deficiency of the CMD decoder 117 may be mitigated by the digital channelizer 340.

Figure 4C:
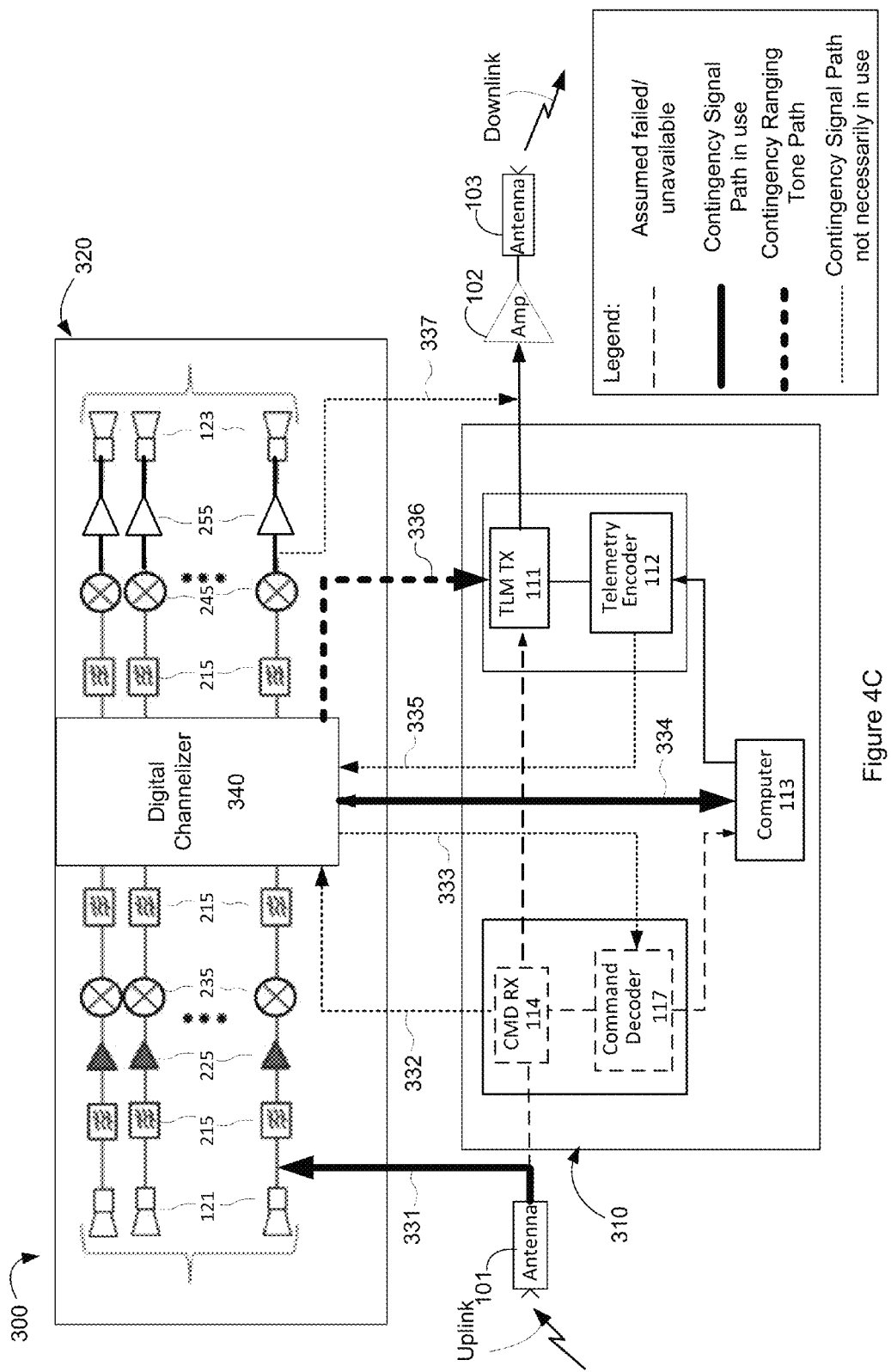

Referring next to FIG. 4C, in the event of deficiencies of both of the command receiver 114 and the command decoder 117, command RF signals received by antenna 101 may be routed by way of the signal path 331 to the payload subsystem 320. The digital channelizer 340 may be configured to provide the CMD functionality normally performed by the command receiver 114 and the command decoder 117 and provide outputs by way of the signal path 334 to the computer 113, and optionally the ranging signal through path 336 to the telemetry transmitter 111. As a result, deficiencies of the command receiver 114 and the command decoder 117 may be mitigated by the digital channelizer 340.

Figure 4D:
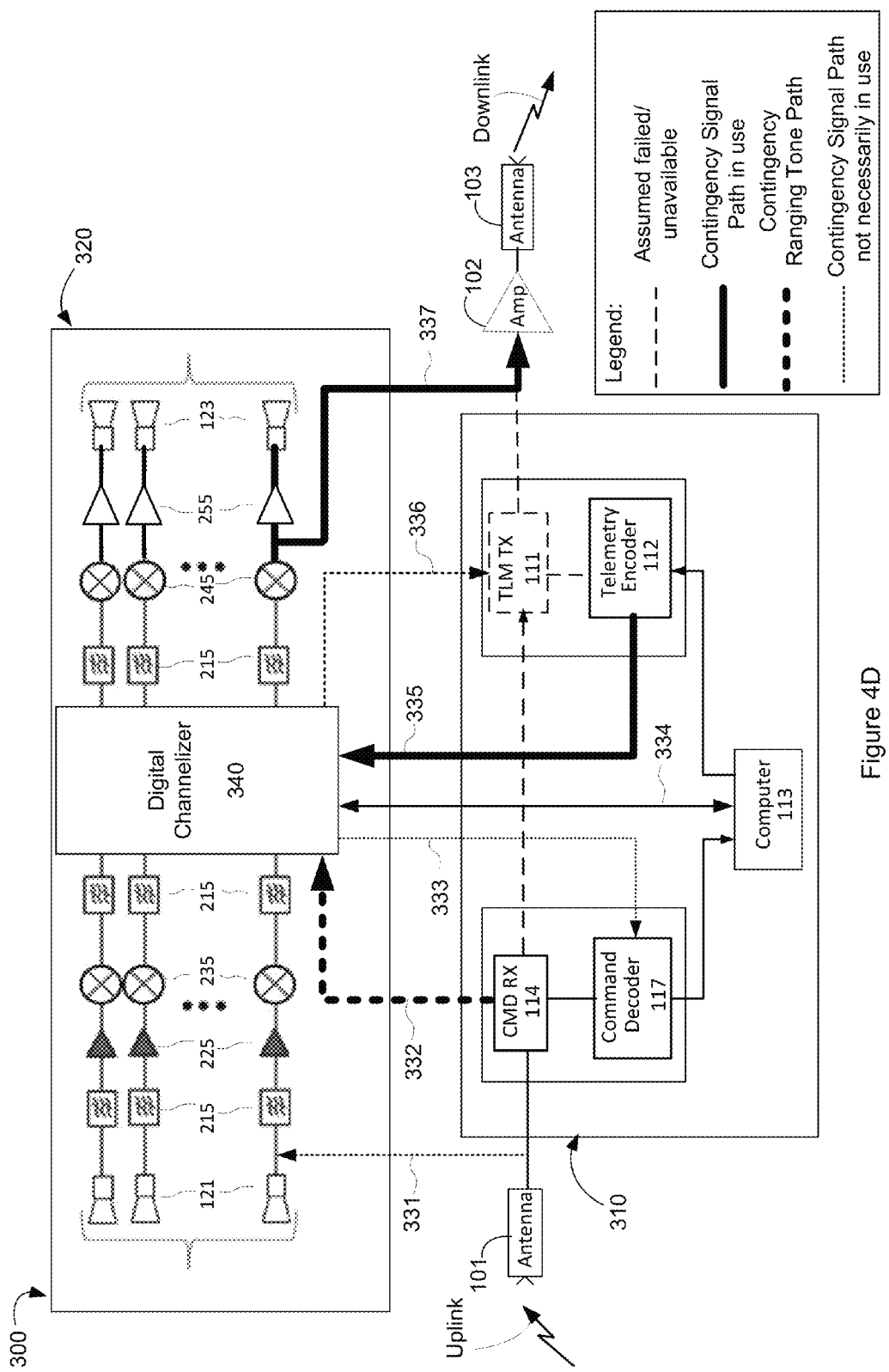

Referring next to FIG. 4D, in the event of a deficiency of the telemetry transmitter 111, outputs of the telemetry encoder 112 may be forwarded by way of the signal path 335 to the digital channelizer 340. The digital channelizer 340 and the payload subsystem 320 may be configured to provide the TLM transmitter functionality normally performed by the TLM transmitter 111. For example, a telemetry baseband signal may be forwarded to the digital channelizer 340 by way of signal path 335, and optionally the ranging signal through path 332 to the digital channelizer 340. The channelizer 340 may modulate the signals onto an intermediate frequency RF signal and forward the RF signal, as shown in the illustrated implementation, by way of a selected filter 215 to a corresponding output frequency converter 245, then over signal path 337 to amplifier 102 for transmission by antenna 103 to an earth station. Alternatively, telemetry RF signals may be transmitted to the ground by way of antennas 123 of the payload system 320. In some implementations, telemetry transmitter antennas may include dedicated omnidirectional antennas or directional high gain communication (payload) antenna. In either case, the modulated intermediate frequency RF signal may be converted to a downlink frequency band in either payload 120 or at the output of TCR subsystem 310. As a result, a deficiency of the telemetry transmitter 111 may be mitigated by the digital channelizer 340.

Figure 4E:
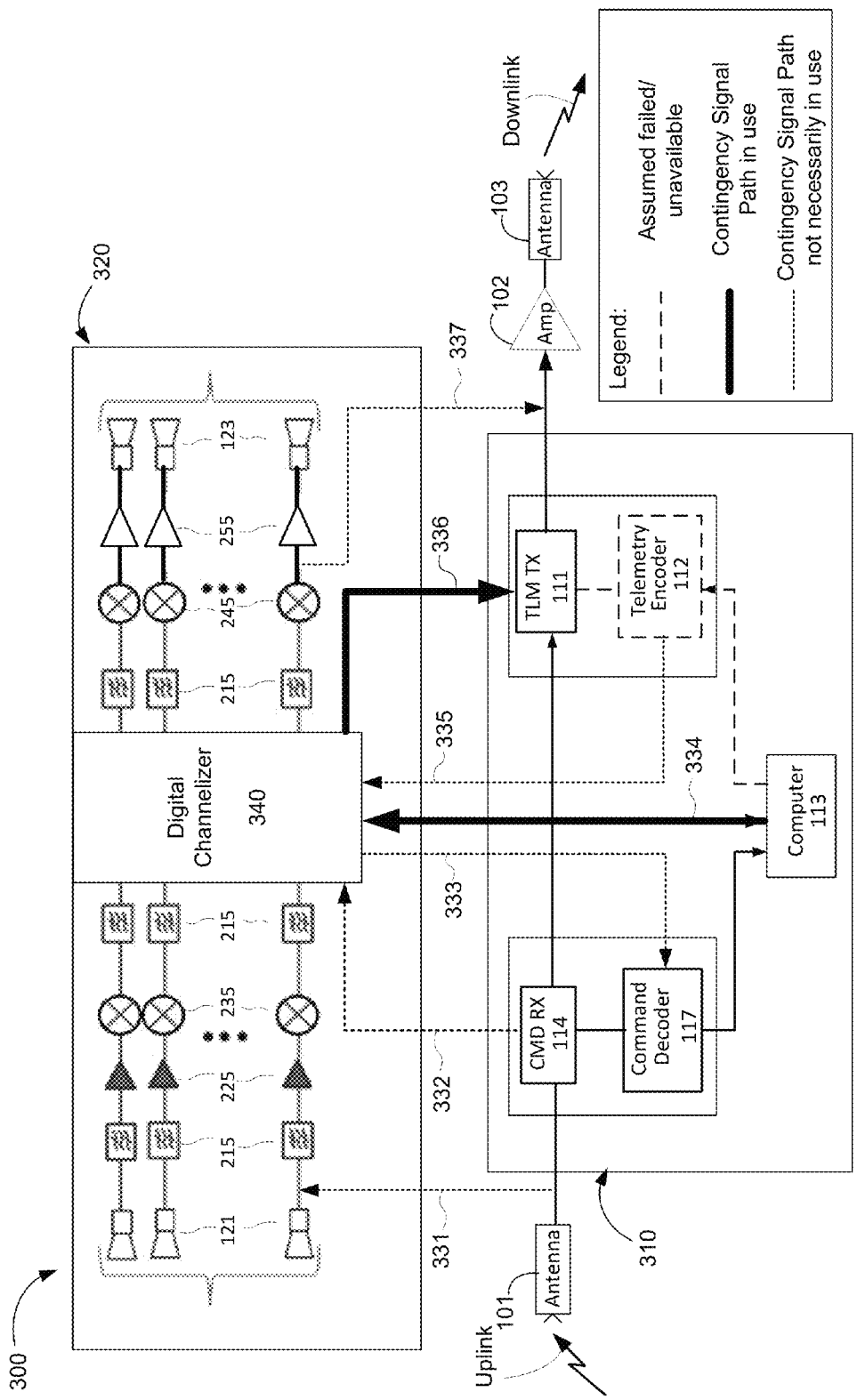

Referring next to FIG. 4E, in the event of a deficiency of the telemetry encoder 112 the computer 113 may forward telemetry data to the channelizer 240 by way of the signal path 334. The digital channelizer 340 may be configured to provide the TLM encoder functionality normally provided by the telemetry encoder 112 and to provide outputs by way of the signal path 336 to the telemetry transmitter 111. As a result, a deficiency of the telemetry encoder 112 may be mitigated by the digital channelizer 340.

Figure 4F:
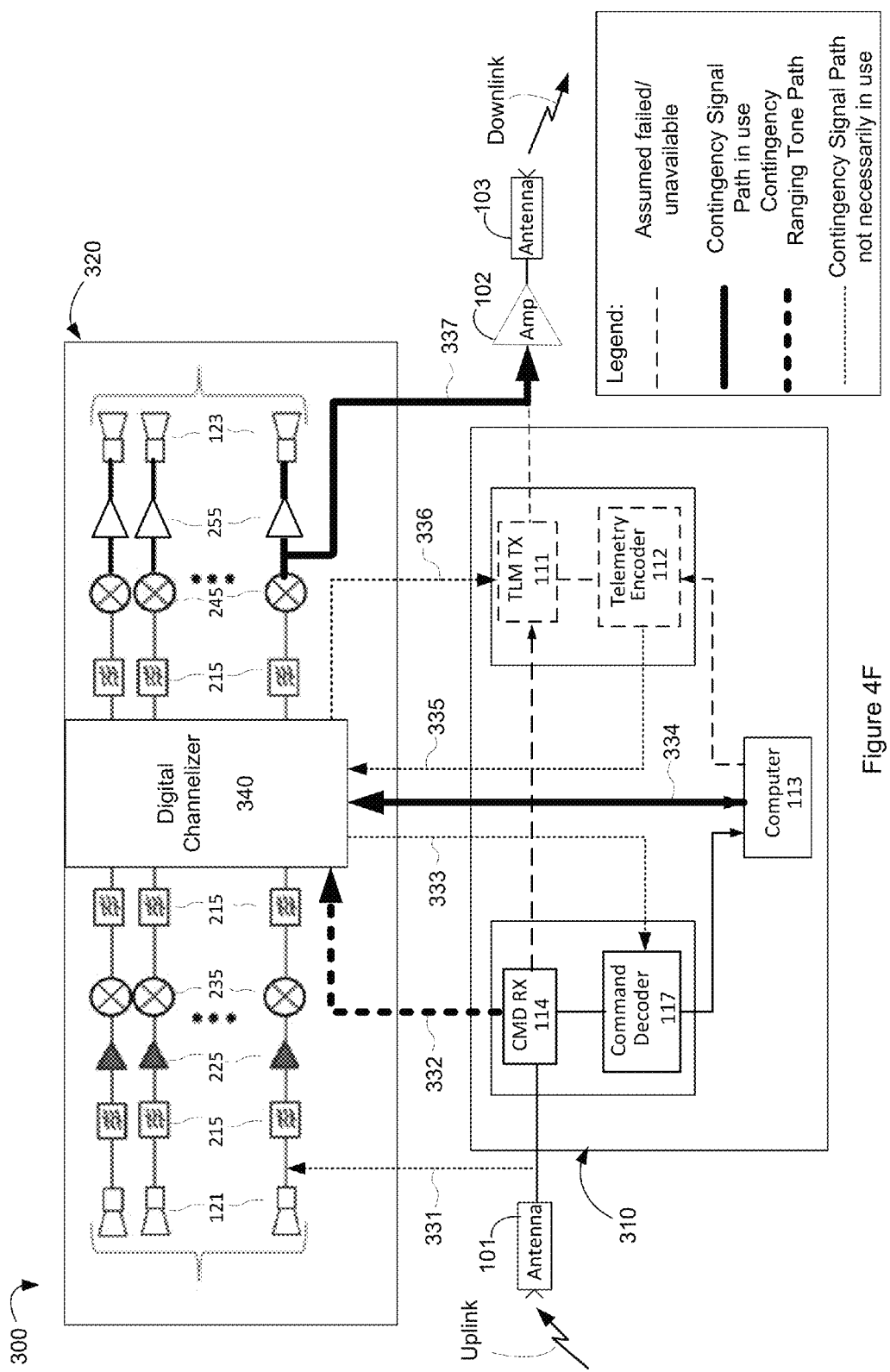

Referring next to FIG. 4F, in the event of deficiencies of both of the telemetry transmitter 111 and the telemetry encoder 112, the computer 113 may forward telemetry data to the channelizer 340 by way of signal path 334, and optionally the ranging signal through path 332 to the digital channelizer 340. The digital channelizer 340 may be configured to provide the TLM functionality normally performed by the telemetry transmitter 111 and the telemetry encoder 112. In some implementations, the channelizer 340 may encode the telemetry data received from the computer 113 and modulate, optionally together with the ranging signal, onto an intermediate frequency RF signal and forward the modulated RF signal, as shown in the illustrated implementation, by way of a selected filter 215 to a corresponding output frequency converter 245, then over signal path 337 to amplifier 102 for transmission by antenna 103 to an earth station. As a result, deficiencies of both of the telemetry transmitter 111 and the telemetry encoder 112 may be mitigated by the digital channelizer 340.

Figure 4G:
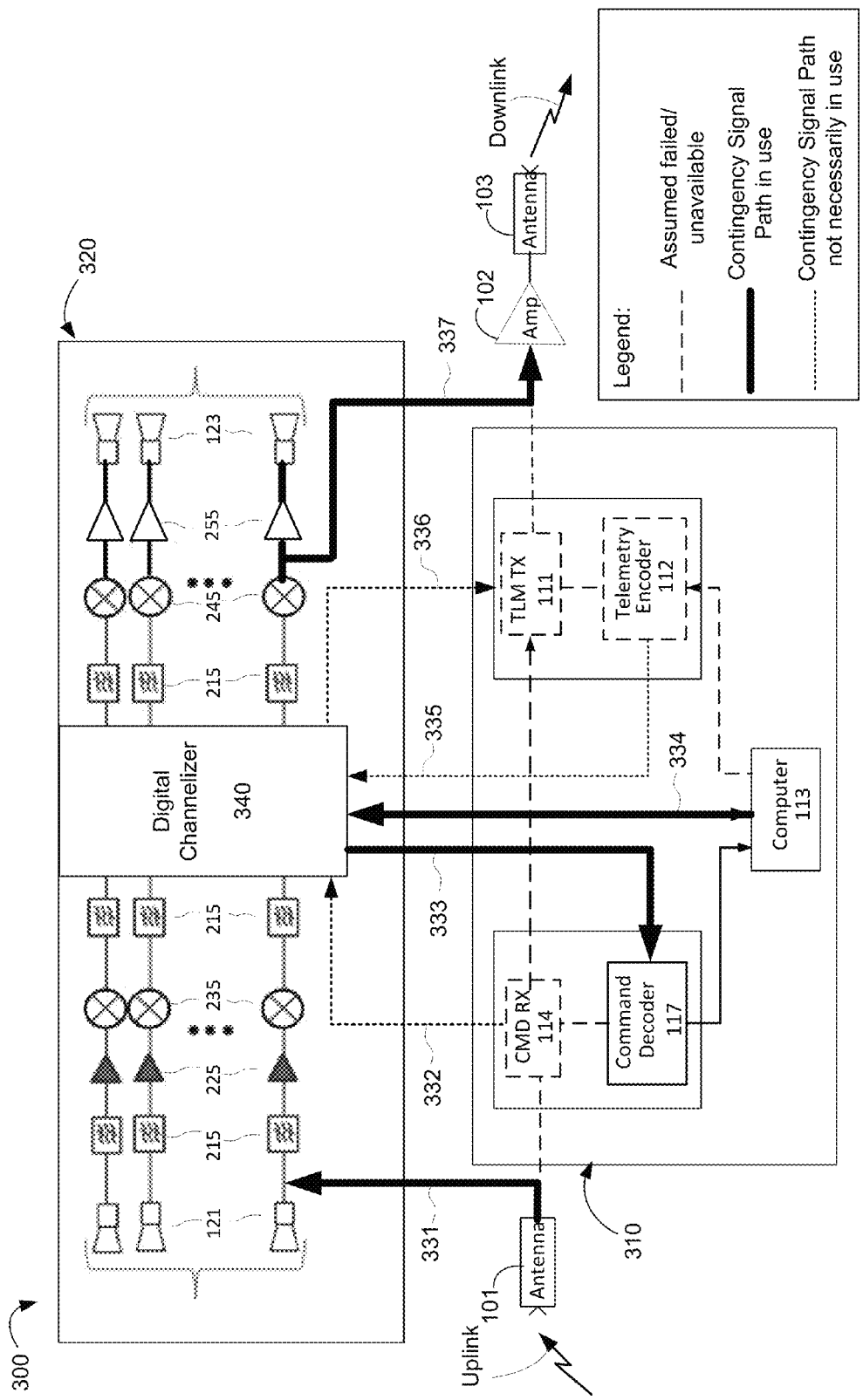

Referring next to FIG. 4G, in the event of deficiencies of the command receiver 114, the telemetry transmitter 111, and the telemetry encoder 112, command RF signals received by antenna 101 may be routed by way of the signal path 331 to the payload subsystem 320. The digital channelizer 340 may be configured to provide the CMD receiver functionality normally performed by the CMD receiver 114 and provide outputs by way of the signal path 333 to the command decoder 117. The computer 113 may forward telemetry data to the channelizer 340 by way of signal path 334. The digital channelizer 340 may be configured to provide the TLM functionality normally provided by the telemetry transmitter 111 and the telemetry encoder 112. In some implementations, the channelizer 340 may encode the telemetry data received from the computer 113 onto an intermediate frequency RF signal and forward the modulated RF signal, as shown in the illustrated implementation, by way of a selected filter 215 to a corresponding output frequency converter 245, then over signal path 337 to amplifier 102 for transmission by antenna 103 to an earth station. As a result, deficiencies of the command receiver 114 as well as both of the telemetry transmitter 111 and the telemetry encoder 112 may be mitigated by the digital channelizer 340.

Figure 4H:
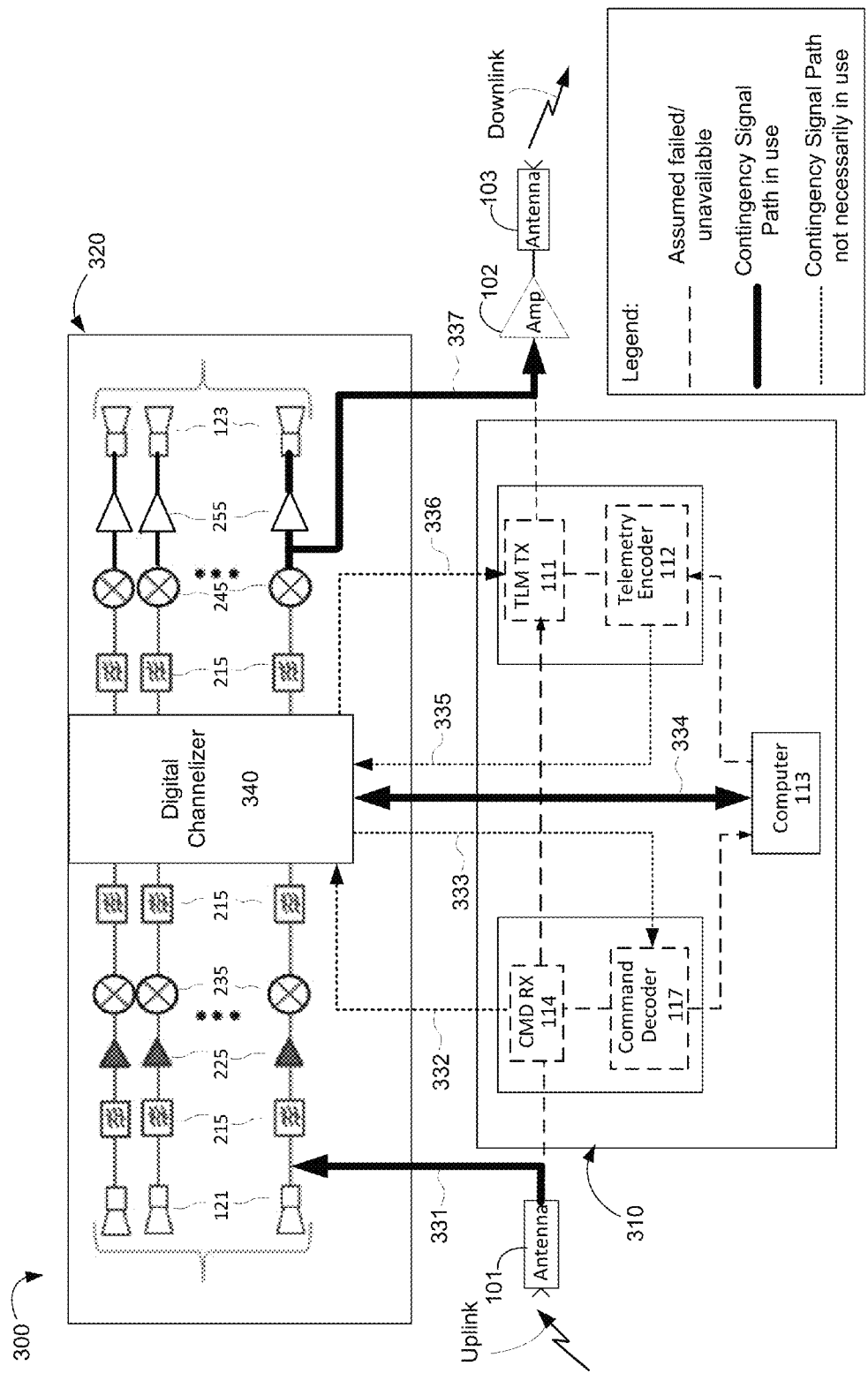

Referring next to FIG. 4H, in the event of deficiencies of the command receiver 114, the command decoder 117, the telemetry transmitter 111, and the telemetry encoder 112, command RF signals received by antenna 101 may be routed by way of the signal path 331 to the payload subsystem 320. The digital channelizer 340 may be configured to provide the CMD functionality normally provided by the command receiver 114 and the command decoder 117 and provide ground-initiated spacecraft commands by way of the signal path 334 to the computer 113. The computer 113 may forward telemetry data to the channelizer 340 by way of signal path 334. The digital channelizer 340 may be configured to provide the TLM functionality normally provided by the telemetry transmitter 111 and the telemetry encoder 112. In some implementations, the channelizer 340 may encode the telemetry data received from the computer 113 onto an intermediate frequency RF signal and forward the modulated RF signal, as shown in the illustrated implementation, by way of a selected filter 215 to a corresponding output frequency converter 245, then over signal path 337 to amplifier 102 for transmission by antenna 103, and/or by antenna 123, to an earth station. As a result, deficiencies of the command receiver 114, the command decoder 117, the telemetry transmitter 111, the telemetry transmitter 111 and the telemetry encoder 112 may be mitigated by the digital channelizer 340.

Referring still to FIG. 4H, it may be observed that the entire T&C subsystem has been effectively bypassed. As a result, in some implementations, the presently disclosed techniques contemplate avoidance of a dedicated T&C subsystem altogether, and thereby reduce spacecraft cost, mass and complexity.

Referring again to FIG. 3 it should be noted that an output from the digital channelizer 340 may be provided by way of signal path 333 to the command decoder 117. Alternatively, or in addition, command RF signals may be received from the ground by way of antennas 121 of the payload subsystem 320. In some implementations, command receive antennas may include dedicated omnidirectional antennas or directional high gain communication (payload) antenna. In either case, received command RF signals may be down-converted to an intermediate frequency, then converted, by the digital channelizer 340, to a baseband signal. The baseband signal may be forwarded to command decoder 117 by way of signal path 333. Alternatively or in addition, the digital channelizer 240 may decode the baseband signal and forward resulting command data by way of signal path 334 to computer 113.

The computer 113 may be configured to actuate respective commandable switches (not illustrated) to open and close, or disable and enable, one or more of signal paths 331, 332, 333, 335, 336, and 337. The commandable switches may be implemented in hardware or software in either the computer 113, the channelizer 340 or in standalone units. Initiation and coordination of switching, and changing the processing or programming within the computer 113 and/or the digital channelizer 340 may come from operator control or automated failure detection in the computer 113 or the channelizer 340 or other controllers in the satellite or ground station or other facilities, or combinations thereof. If the CMD and/or TLM functionalities in the channelizer are active (hot) all the time, response to a deficiency can simply be ignoring or disabling the (whole or subset of) signal or data from the deficient unit(s) by a command or a voting mechanism in a downstream unit in the signal path.

Figure 5:
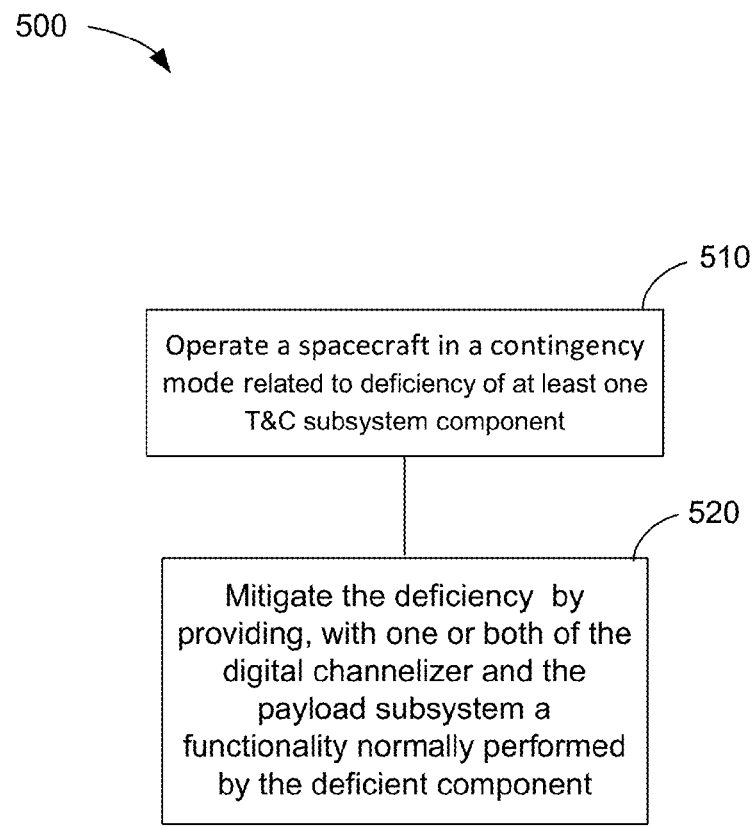
FIG. 5 illustrates a method of operating a spacecraft in a contingency mode according to an implementation.

Referring now to FIG. 5, a method 500 of operating a spacecraft in a contingency mode according to an implementation is illustrated. The method 500 may begin, at block 510 with operating the spacecraft in the contingency mode. The contingency mode may relate to a deficiency of at least one the command receiver, the command decoder, the telemetry transmitter and the telemetry encoder of the spacecraft T&C subsystem.

The method may continue, at block 520, with mitigating the deficiency by providing, with one or both of a digital channelizer and a payload subsystem of the spacecraft, a functionality normally performed by the at least one of the command receiver, the command decoder, the telemetry transmitter and the telemetry encoder.

Implementations of the subject matter described in this specification may be implemented as one or more computer programs, i.e., one or more modules of computer program instructions, encoded on non-transitory computer readable medium for execution by, or to control the operation of, a processor, such as, for example, computer 113 or digital channelizer 340, or both.

Thus, improved techniques for supplementing T&C functionality on a spacecraft have been disclosed. The foregoing merely illustrates principles of the invention. It will thus be appreciated that those skilled in the art will be able to devise numerous systems and methods which, although not explicitly shown or described herein, embody the principles of the invention and are thus within the spirit and scope of the invention as defined by the following claims.

What is claimed is:

1. A spacecraft comprising:
a payload subsystem including a digital channelizer; wherein:
the digital channelizer provides a portion of spacecraft command functionality and spacecraft telemetry functionality;
the spacecraft command functionality consists of down converting and demodulating a command carrier signal to a first intermediate frequency (IF) baseband signal, bit-detecting the IF baseband signal and formatting a resulting bit stream into digital command data; the spacecraft telemetry functionality consists of processing or encoding spacecraft telemetry data into a baseband signal, modulating the baseband signal onto a second IF signal and upconverting the modulated baseband signal to a radio frequency (RF) carrier signal; and
the payload subsystem is capable of providing all of the spacecraft command functionality and the spacecraft telemetry functionality.

2. The spacecraft of claim 1, wherein the payload subsystem provides all of the spacecraft command functionality or the spacecraft telemetry functionality.

3. The spacecraft of claim 2, wherein the spacecraft excludes a dedicated telemetry and command subsystem.

4. The spacecraft of claim 1, further comprising:
a telemetry and command (T&C) subsystem, the T&C subsystem including one or more of a command (CMD) receiver, a CMD decoder, a telemetry (TLM) encoder and a TLM transmitter, wherein:
the digital channelizer is communicatively coupled with at least one of the CMD receiver, the CMD decoder, the TLM transmitter and the TLM encoder.

5. The spacecraft of claim 4, wherein
the digital channelizer is communicatively coupled with two or more of the CMD receiver, the CMD decoder, the TLM transmitter and the TLM encoder by a respective signal path.

6. The spacecraft of claim 5, wherein at least one of the respective signal paths can be actuated on or off.

7. The spacecraft of claim 5, further comprising a computer, wherein
the digital channelizer is communicatively coupled with the computer; and
one or both of the digital channelizer and the computer are configured to select one or more of the respective signal paths.

8. The spacecraft of claim 7, wherein one or both of the digital channelizer and the computer are configured to actuate the respective signal paths on or off.

9. The spacecraft of claim 4 wherein the T&C subsystem includes a ranging capability.

10. The spacecraft of claim 1, wherein the payload subsystem is configured to provide one or more of a command (CMD) receiver functionality, a CMD decoder functionality, a CMD functionality, a telemetry (TLM) transmitter functionality, a TLM encoder functionality and a TLM functionality.

11. The spacecraft of claim 10, wherein the payload subsystem is configured to mitigate a deficiency in one or more of the CMD receiver, the CMD decoder, the TLM transmitter, and the TLM encoder.

12. The spacecraft of claim 11, wherein the deficiency results from a component failure or other reason.

13. The spacecraft of claim 10, wherein the payload subsystem is configured to mitigate one or more deficiencies in two or more of the CMD receiver, the CMD decoder, the TLM transmitter, and the TLM encoder.

14. The spacecraft of claim 10, wherein the payload subsystem is configured to mitigate one or more deficiencies of three or more of the CMD receiver, the CMD decoder, the TLM transmitter and the TLM encoder.

15. A method comprising:
operating a spacecraft in a contingency mode, the spacecraft including a telemetry command (T&C) subsystem and a payload subsystem, the T&C subsystem including one or more of a command receiver, a command decoder, a telemetry encoder and a telemetry transmitter, the payload subsystem including a digital channelizer; wherein:
the contingency mode includes a deficiency of at least one of the command receiver, the command decoder, the telemetry transmitter and the telemetry encoder, the deficiency resulting from a component failure or other reason;
operating the spacecraft in the contingency mode includes mitigating the deficiency by providing, with the digital channelizer, one or both of a portion of spacecraft command functionality and a portion of spacecraft telemetry functionality the spacecraft command functionality consisting of down converting and demodulating a command carrier signal to a first intermediate frequency (IF) baseband signal, bit-detecting the IF baseband signal and formatting a resulting bit stream into digital command data and the spacecraft telemetry functionality consisting of processing or encoding spacecraft telemetry data into a baseband signal, modulating the baseband signal onto a second IF signal and upconverting the modulated baseband signal to a radio frequency (RF) carrier signal; and
the payload subsystem is capable of providing all of the spacecraft command functionality and the spacecraft telemetry functionality.

16. The method of claim 15, wherein the digital channelizer is communicatively coupled with at least one of the command receiver, the command decoder, the telemetry transmitter and the telemetry encoder.

17. The method of claim 15, wherein:
the payload subsystem is configured to provide one or more of a command (CMD) receiver functionality, a CMD decoder functionality, a CMD functionality, a telemetry (TLM) transmitter functionality, a TLM encoder functionality and a TLM functionality.

18. A non-transitory computer readable medium having software stored thereon, the software including instructions for causing a processor to:
operate a spacecraft in a contingency mode, the spacecraft including a telemetry command (T&C) subsystem and a payload subsystem, the T&C subsystem including one or more of a command receiver, a command decoder, a telemetry encoder and a telemetry transmitter, the payload subsystem including a digital channelizer; wherein:
the contingency mode includes a deficiency of at least one of the command receiver, the command decoder, the telemetry transmitter and the telemetry encoder, the deficiency resulting from a component failure or other reason;
operating the spacecraft in the contingency mode includes mitigating the deficiency by providing, with the digital channelizer, one or both of a spacecraft command functionality and a portion of spacecraft telemetry functionality the spacecraft command functionality consisting of down converting and demodulating a command carrier signal to a first intermediate frequency (IF) baseband signal, bit-detecting the IF baseband signal and formatting a resulting bit stream into digital command data and the spacecraft telemetry functionality consisting of processing or encoding spacecraft telemetry data into a baseband signal, modulating the baseband signal onto a second IF signal and upconverting the modulated baseband signal to a radio frequency (RF) carrier signal; and
the payload subsystem is capable of providing all of the spacecraft command functionality and the spacecraft telemetry functionality.

19. The computer readable medium of claim 18, wherein the digital channelizer is communicatively coupled with at least one of the command receiver, the command decoder, the telemetry transmitter and the telemetry encoder.

20. The computer readable medium of claim 18, wherein:
the payload subsystem is configured to provide one or more of a command (CMD) receiver functionality, a CMD decoder functionality, a CMD functionality, a telemetry (TLM) transmitter functionality, a TLM encoder functionality and a TLM functionality.

* * * * *